United States Patent [19]

Kessel

[11] Patent Number: 4,903,639
[45] Date of Patent: Feb. 27, 1990

[54] TEAT DISINFECTING METHOD

[76] Inventor: Dan W. Kessel, P.O. Box 634, Alto, Tex. 75925

[21] Appl. No.: 238,981

[22] Filed: Aug. 23, 1988

Related U.S. Application Data

[63] Continuation of Ser. No. 918,557, Oct. 14, 1986, abandoned.

[51] Int. Cl.$^4$ .............................................. A01K 29/00
[52] U.S. Cl. .................................................... 119/159
[58] Field of Search ................ 119/158, 159; 604/73, 604/289, 290

[56] References Cited

U.S. PATENT DOCUMENTS

| | | | |
|---|---|---|---|
| 701,521 | 6/1902 | Studley | 604/293 |
| 2,731,300 | 1/1956 | Jansen | 119/159 |
| 3,170,171 | 2/1965 | Mayhew et al. | 119/159 |
| 3,267,903 | 8/1966 | Valentine | 119/159 |
| 3,713,423 | 1/1973 | Sparr, Sr. | 604/289 |
| 4,341,183 | 7/1982 | Metzler | 119/158 |

FOREIGN PATENT DOCUMENTS

| | | | |
|---|---|---|---|
| 29240 | 5/1981 | European Pat. Off. | 119/158 |
| 2501965 | 9/1982 | France | 119/159 |
| 599772 | 3/1978 | U.S.S.R. | 119/159 |
| 609516 | 6/1978 | U.S.S.R. | 119/158 |

Primary Examiner—Robert P. Swiatek
Assistant Examiner—Michael Lynch
Attorney, Agent, or Firm—Ross, Howison, Clapp & Korn

[57] ABSTRACT

A device and method for application of a disinfecting solution to the teats of lactating dairy animals. The device comprises an elongated hollow tube, one end of which is adapted to form a circular loop and the other end of which forms an open ended disinfectant delivery tube. The device further includes a plurality of spray emmission means disposed about the inner circumference of the circular loop and lying generally in the plane of the loop. The open-ended delivery tube is adapted to be attached to a source of pressurized disinfectant solution.

3 Claims, 2 Drawing Sheets

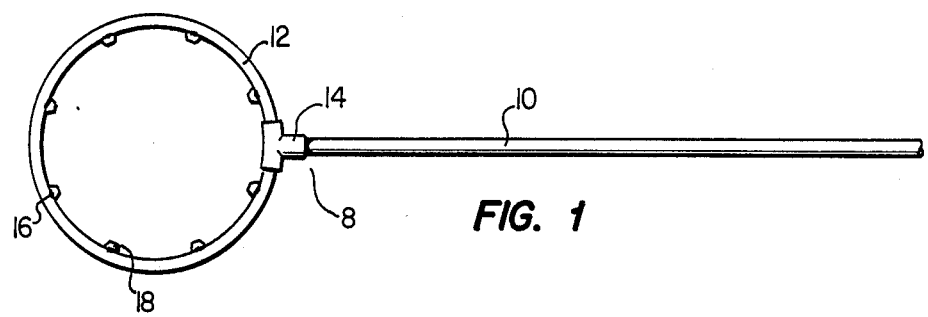
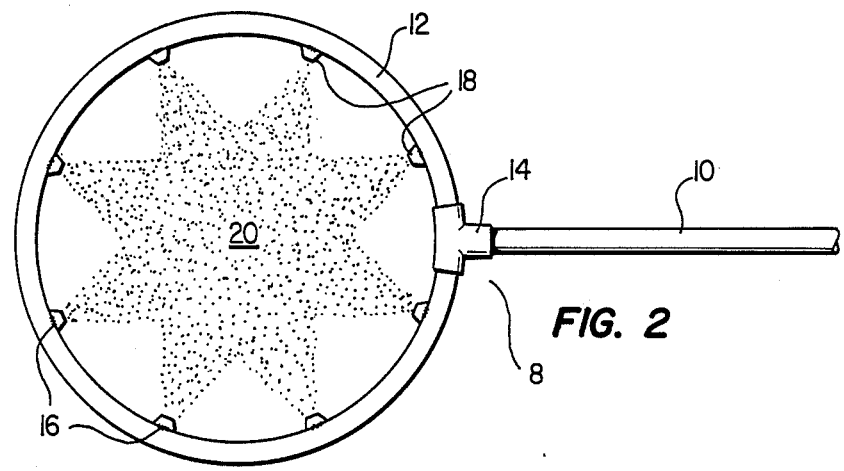
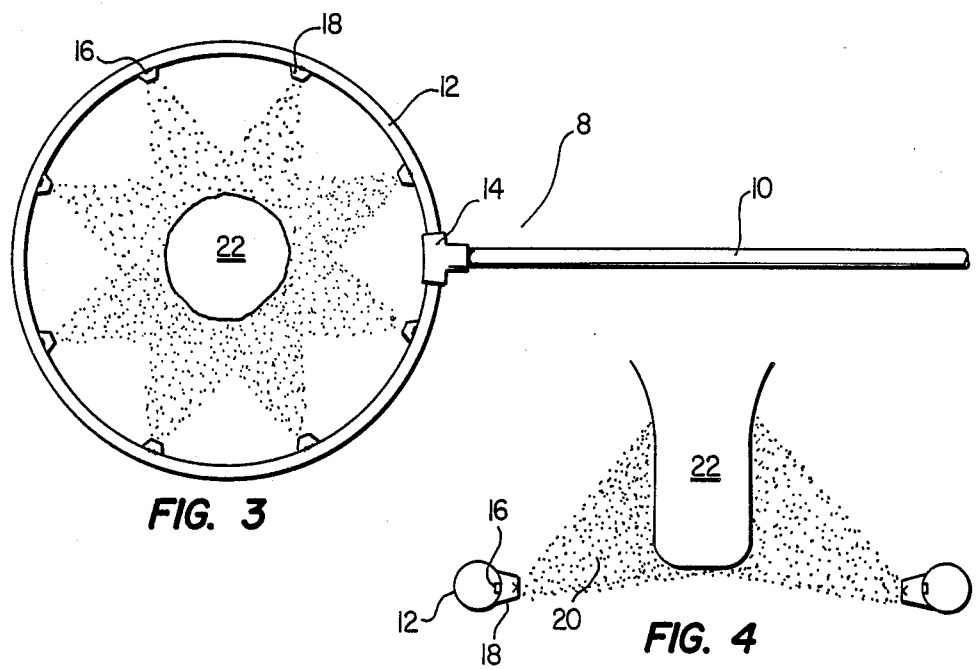

TEAT DISINFECTING METHOD

This application is a continuation, of application Ser. No. 918,557, filed Oct. 14, 1986, now abandoned.

FIELD OF THE INVENTION

This invention relates generally to devices and methods for applying a disinfecting solution to the teats of lactating dairy animals in conjunction with procedures for production of milk therefrom and in prevention of the development and transmission of teat and udder infections and diseases.

BACKGROUND OF THE INVENTION

In connection with the operation of a modern dairy facility, it is normal for the operator to systematically and regularly treat the teats of lactating dairy animals in order to prevent the development and transmission of mastitis and other infections of the teats and udder. Health regulations and modern dairy practice mandate such disinfecting practice.

Despite the common use of such disinfecting practices, teat and udder infections have continued to present a significant problem for dairy operators, and there have been continuous efforts to develop effective and economical devices and methods of infection control.

In recent years the most common method of disinfection involves teat dipping, or immersion of the teats of lactating dairy animals in a disinfectant solution contained in a teat cup. This practice has, however, been found to be a contributing factor in the transmission of teat and udder infections and diseases, in that the infecting organisms are not completely destroyed by normally utilized disinfectant solutions, and may be transmitted by immersion of the teats of uninfected animals in a contaminated solution.

Commonly used alternative methods of disinfection, such as spraying of disinfectant solution upon the teats from a single nozzle, fail to achieve complete and effective application without use of an excessive volume of disinfectant solution. Such methods, to be reasonably effective, require careful and skillful application techniques which are difficult to consistently achieve in normal milking procedures.

It is apparent that a device and method for thorough and efficient application of disinfectant solution to the teats of dairy animals was desired and needed by the dairy industry.

SUMMARY OF THE INVENTION

The device of the invention generally comprises a thin walled, hollow tube, one end of which is formed into a circular loop. The hollow tube is preferably divided into two portions: a circular loop portion and a straight portion interconnected thereto which is open at the end opposite the loop. The circular loop portion is preferably formed such that the loop is closed, enclosing a hollow intratubal cavity. The circular loop portion of the tube is interconnected to the straight portion of the tube such that the intratubal cavity is continuous and unbroken from the open end of the tube, through the area of interconnection or transition between the straight portion of the tube and the looped portion of the tube, and through the looped portion. The device further comprises a plurality of spray emitting means disposed about the inner circumference of the looped portion of the tube and being generally in the plane of the loop. Such spray emitting means, preferably being nozzles, penetrate the wall of the tube and interconnect with the intratubal cavity so as to allow the passage of fluid from such cavity into and through such nozzles and emissions of fluid from such nozzles in the direction of the axis of the loop. The spray nozzles are adapted such that a fluid, forced under pressure from the intratubal cavity through the nozzles, is dispersed or atomized into a fine mist directed toward the axis of the loop to which such nozzles are affixed. The spray nozzles are preferably adapted such that the mist emitted from each nozzle is dispersed in a semi-conical pattern. The device comprises a sufficient number of such spray nozzles that continuous mist coverage of at least the central half of the circular area defined by the loop is obtained during simultaneous emission of fluid from the nozzles.

The open end of the device is adapted so that it can be mated with and removeably attached to a source of pressurized fluid by any suitable connecting means which allows the introduction of pressurized fluid into the open end of the device.

In operation or method of use, the device is first connected to the source of pressurized fluid to be used and the loop of the device is placed in proximity to a teat to be sprayed with the disinfecting solution, positioned such that the plane of the loop is slightly below the bottom or nipple of the teat. A sufficient volume of disinfecting solution to uniformly cover the surface area of the teat is introduced into the open end of the device with sufficient pressure to force the same volume of disinfecting solution to be emitted as mist from the spray nozzles and contact the surface of the teat.

These and other features and advantages of the present invention may be more readily understood with reference to the accompanying drawings, wherein:

BRIEF DESCRIPTION OF THE DRAWINGS

FIG. 1 is a plan view of the preferred embodiment of the device of the invention.

FIG. 2 is a plan view of the loop portion of the preferred embodiment of the device of the invention, with an illustration of spray pattern.

FIG. 3 is a plan view of a portion of the device illustrating its placement around a teat and illustrating spray pattern.

FIG. 4 is an elevational section view taken generally on line 4—4 of FIG. 3.

DETAILED DESCRIPTION OF THE INVENTION

Figure 5:
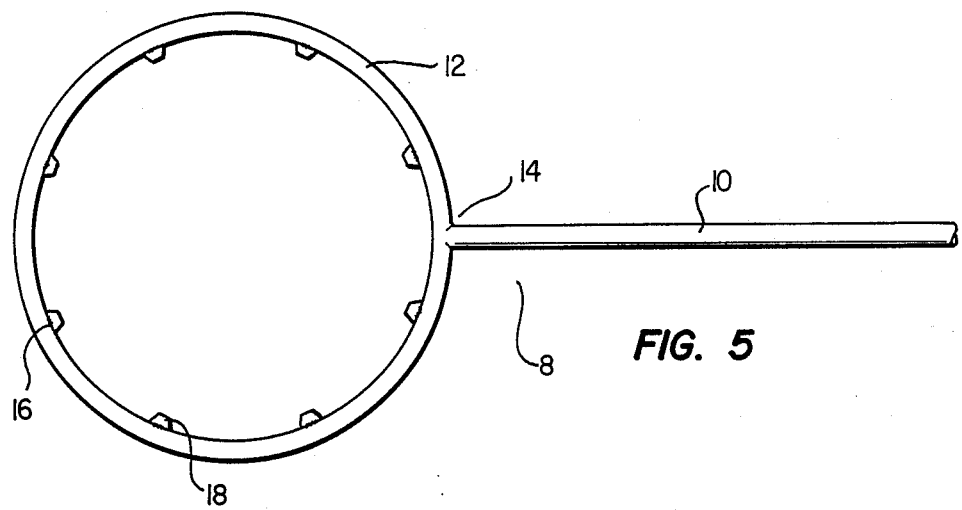
FIG. 5 illustrates an alternative embodiment of the device.

With reference to the drawing figures, a detailed description of the preferred embodiment of the invention will be provided. Referring first to FIG. 1, the device 8 of the invention will be seen to comprise a first thin walled hollow tube 10 and a second thin walled hollow tube 12. The walls of both first tube 10 and second tube 12 define and enclose a central hollow cavity, and each tube is open at both ends so as to allow the introduction of fluid therein and the passage of such fluid through said hollow cavities. Said tubes 10 and 12 are preferably of substantially circular cross-section, but may be constructed with any cross-sectional configuration which defines a central cavity, such as square or triangular. As depicted in FIG. 1, first tube 10 is substantially straight along its length. Second tube 12 is curved into a loop which is substantially circular as viewed perpendicular to the plane of the loop.

The device 8 preferably further includes innerconnecting means 14, adapted to interconnect one end of first tube 10 with both ends of second tube 12 such that the intratubal cavity is continuous from the second end of first tube 10, through said interconnecting means 14 and about the loop of second tube 12. Said interconnecting means comprises a substantially "T" shaped interior or cavity enclosed by a continuous wall. The outer end of each leg of such "T" is open and adapted to receive and surround an end of either first tube 10 or second tube 12 in mating relationship to as to provide a leak proof interconnection. It will be understood that the cross-sectional configuration of the outer end of each leg of such interconnecting means 14 will be matched to the cross-sectional configuration of the respective end of either first tube 10 or second tube 12 to be received therein. The interconnection between interconnecting means 14 and the respective ends of tubes 10 and 12 may be secured by press fit or by any suitable adhesive means.

Figure 6:
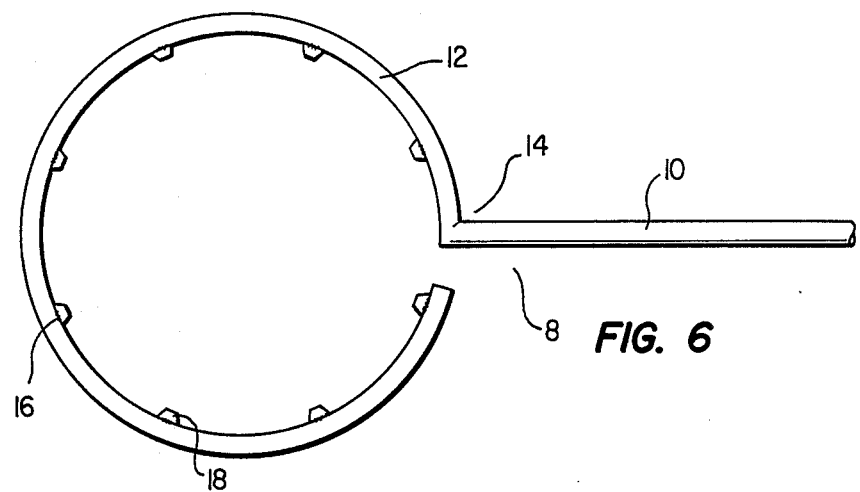
FIG. 6 illustrates a second alternative embodiment of the device.
Figure 7:
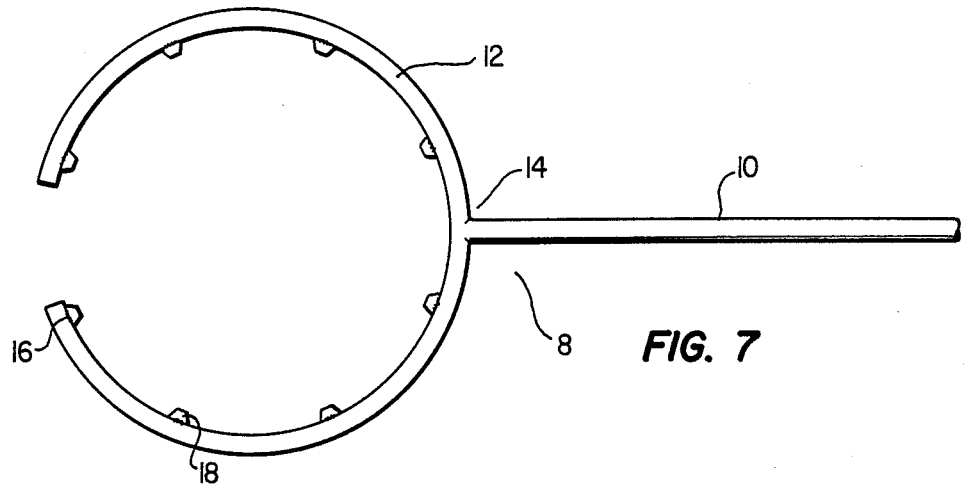
FIG. 7 illustrates a third alternative embodiment of the device.

In an alternative embodiment of the device of the invention, illustrated by FIG. 5, what has been previously described as first tube 10 and second tube 12 may be integrally formed, in the gross configuration depicted in FIG. 1 and FIG. 2 and described above, as a continuous tube. Further alternative embodiments of the device of the invention, such as those illustrated in FIG. 6 and FIG. 7, wherein the looped portion of the device is not fully closed, may be utilized without departing from the spirit of the invention. It will be readily understood that, in such alternative embodiments which employ a broken loop, the end or ends of the tube or tubes forming such broken loop must be closed to prevent the emission of fluid therethrough.

As can be seen in the drawing figures, device 8 further includes a plurality of spray emitting means disposed about the inner periphery of tube 12 generally in the plane of the loop formed by tube 12. Such spray emitting means may be small holes or apertures fully penetrating the wall of tube 12, adapted to produce a fine spray or mist upon the passage of pressurized fluid therethrough. However, in the preferred embodiment as depicted in FIG. 1 through FIG. 4 said spray emitting means comprise apertures 16 adapted to receive nozzle 18. Each nozzle 18 communicates through each respective aperture 16 to the intratubal cavity enclosed by tube 12 so as to allow the passage of fluid from such cavity into and through nozzles 18 and emission of fluid from such nozzles in the direction of the axis of the loop. Nozzles 18 are adapted such that a fluid of essentially the same specific gravity and viscosity as water, forced under pressure from the intratubal cavity through nozzles 18, is dispersed or atomized into a fine mist. Nozzles 18 are preferably further adapted such that the mist emitted therefrom is dispersed in a semiconical pattern as illustrated in FIG. 4, which can be described as that portion of a cone, with its apex at the point of emission of fluid from the nozzle and with its axis perpendicular intersecting the axis of the loop of the axis perpendicularly intersecting the axis of the loop of the device, lying on one side the plane of the loop. The number of apertures 16 and corresponding nozzles 18 is selected such that a spray pattern 20 of continuous mist coverage of at least the central half of the circular area enclosed by the loop of the device is obtained during simultaneous emission of fluid from the nozzles, as illustrated in FIG. 2 and FIG. 3.

The open end of tube 10 is adapted to be removeably attached to a source of pressurized fluid by any suitable attachment means which allows the introduction of pressurized fluid into the intratubal cavity of device 8 through said open end of tube 10. Said source of pressurized fluid will commonly consist of a hand held trigger-pump bottle, but device 8 is readily adaptable to use with pressurized aerosol cans, fixed pressurized containers with flexible hose connections and valved attachment means, or other commonly known fluid distribution systems. The attachment of device 8 to the fluid source must, however, be accomplished in such fashion that the operator of device is able to control the introduction of pressurized fluid into the device for emission from nozzles 18 by manual pump operation or operation of a suitable value.

The tubular loop portion of device 8 will preferably be approximately four inches in diameter, and tube 10 will preferably be approximately eight inches in length. However, it will be readily understood that specific dimensions are not critical to the function and utility of the invention, and any loop diameter and device length which reasonably allows operation as hereinafter described may be utilized within the spirit of the invention.

Device 8 is preferably constructed of a plastic material of sufficient strength and rigidity to maintain its shape and gross configuration, and of chemical characteristics which render the material essentially inert with respect to the disinfecting solution to be utilized. However, it will be understood that any material of suitable properties and characteristics may be used.

In operation, device 8 is first attached to the selected source of pressurized fluid to be used and sufficient fluid is introduced into the intratubal cavity to fill such cavity. The fluid consists of any liquid disinfectant solution approved for use to disinfect the teats of lactating dairy animals. The loop of the device is placed in proximity to a teat to be sprayed with the disinfecting solution, and positioned such that the center of the circular areas enclosed by the loop is generally aligned with the longitudinal axis of the teat and the plane of the loop is generally perpendicular to such longitudinal axis, with the bottom or nipple of the teat being slightly above the plane of the loop, so that the bottom of teat 22 is within spray pattern 20, illustrated in FIG. 4. A sufficient volume of disinfecting solution to uniformly cover the surface area of the teat is introduced into the open end of the device 8 with sufficient pressure to force the same volume of disinfecting solution to be emitted as mist from nozzles 18 and contact the surface of teat 22. Upon completion of mist emission from such nozzles, the device is removed from around the teat so treated, positioned around the next teat to be treated, and the process is repeated as many times as necessary to complete the disinfecting process.

The subject device, used with the method described, allows complete coverage of each treated teat with disinfecting solution, conserves the disinfecting solution by avoiding application of excessive amounts of solution to the teat, and avoids contamination of the reserved disinfecting solution by preventing direct contact with the teat. In the drawings and specification there has been set forth a preferred embodiment of the invention, and although specific terms are employed, their use is in a generic and descriptive sense only, and not for purposes of limitation.

What is claimed is:

1. A method of disinfecting the teats of a dairy animal, comprising the steps of:

releasably attaching one end of a straight thin walled hollow tube portion of a teat disinfecting device to a source of pressurized disinfecting fluid, the one end being open;

placing the portion of the teat disinfecting device which is formed of thin walled hollow tubing into the shape of a loop about one teat of dairy animal, with the plane of said loop essentially perpendicular to the longitudinal axis of the teat and with the bottom end of the teat positioned slightly above the plane of said loop;

introducing pressurized disinfecting fluid from said source into the open end of said teat disinfecting device;

allowing said pressurized disinfecting fluid to flow from said source through the cavity of said straight tubular portion of the device, through interconnecting means, through the looped tubular portion of the device, and to be emitted from a plurality of spray emitting means as a disinfecting mist disposed in the plane of the loop about the inner circumference of said looped tubular portion of the device, the spray emitting means directing a conical shaped disinfecting mist toward the longitudinal axis of the teat and above the plane of the loop to cover all surfaces of the teat;

allowing emission of disinfecting mist from said spray emitting means until the teat is suitably treated with such disinfecting mist;

ceasing introduction of pressurized disinfecting fluid into the device;

removing the device from about the teat so treated; and relocating the device to the next teat to be treated with disinfecting fluid and repeating the above steps, beginning with introduction of disinfecting fluid into the device, until treatment is completed.

2. A method for application of a disinfecting fluid to the teats of dairy animals, comprising the steps of:

providing a plurality of dispensing nozzles in a common plane and disposed equi-distant from a centrally disposed longitudinal axis that is substantially perpendicular to the common plane and spaced evenly apart;

each of the nozzles operable to receive the disinfecting fluid under pressure and emitting the disinfecting fluid as a disinfecting mist in a pattern that flares outward from each of the nozzles, the nozzles in combination directing the disinfecting mist at all angles with respect to the longitudinal axis above said common plane;

the flared pattern generally directed outward and upward from the common plane of the nozzles such that a portion of the flared pattern is substantially parallel to the common plane;

delivering the disinfecting fluid under pressure to each of the nozzles;

supporting the nozzles in the common plane thereof; and manipulating the common plane of the nozzles such that the common plane is disposed underneath the teat of a cow and perpendicular therewith with the longitudinal axis substantially aligned with the teat such that the disinfecting mist expelled therefrom covers the entire surface areas of the teat.

3. A method for application of a disinfecting fluid to the teats of dairy animals, comprising the steps of:

providing a plurality of dispensing nozzles in a common plane and disposed equi-distant from a centrally disposed longitudinal axis that is substantially perpendicular to the common plane and spaced evenly apart;

each of the nozzles operable to receive the disinfecting fluid under pressure and emitting the disinfecting fluid as a disinfecting mist in a pattern that flares outward from each of the nozzles in a conical pattern with one side of the conical pattern parallel with the plane of the nozzles, the nozzles in combination directing the disinfecting mist at all angles with respect to the longitudinal axis above said common plane;

the flared pattern generally directed outward and upward from the common plane of the nozzles such that a portion of the flared pattern is substantially parallel to the common plane;

delivering the disinfecting fluid under pressure to each of the nozzles;

supporting the nozzles in the common plane thereof; and manipulating the common plane of the nozzles such that the common plane is disposed underneath the teat of a cow and perpendicular therewith with the longitudinal axis substantially aligned with the teat such that the disinfecting mist expelled therefrom covers the entire surface area of the teat.

* * * * *